United States Patent [19]

Hayman

[11] 4,397,330

[45] Aug. 9, 1983

[54] MIXING VALVE FOR BACK TO BACK INSTALLATION

[75] Inventor: Dennis J. Hayman, Bloomfield Hills, Mich.

[73] Assignee: United States Brass Corporation, Plano, Tex.

[21] Appl. No.: 294,366

[22] Filed: Aug. 19, 1981

[51] Int. Cl.³ .............................................. F16K 11/06
[52] U.S. Cl. ............................. 137/270; 137/625.41; 137/625.4
[58] Field of Search ................. 137/625.41, 270, 625.4

[56] References Cited

U.S. PATENT DOCUMENTS

| | | | |
|---|---|---|---|
| 3,674,048 | 7/1972 | Manoogian et al. | 137/625.41 X |
| 3,831,621 | 8/1974 | Anthony et al. | 137/270 |
| 4,005,728 | 2/1977 | Thorp | 137/270 |
| 4,362,186 | 12/1982 | Parkison et al. | 137/625.4 X |

Primary Examiner—Arnold Rosenthal
Attorney, Agent, or Firm—Wm. T. Wofford; James C. Fails; Arthur F. Zobal

[57] ABSTRACT

The invention pertains to improved single handle mixing valves suitable for use in back to back installations, as for example tub/shower valves in an apartment building or hotel. In such installations it is important to provide for proper orientation of valve water mix control parts so as to prevent the water mix from being uncomfortably or dangerously hot in the initial phase of valve opening. The invention provides structure and arrangement such that proper orientation can be achieved by a simple re-orientation or reversal of a part or parts exteriorly of the valve body.

2 Claims, 7 Drawing Figures

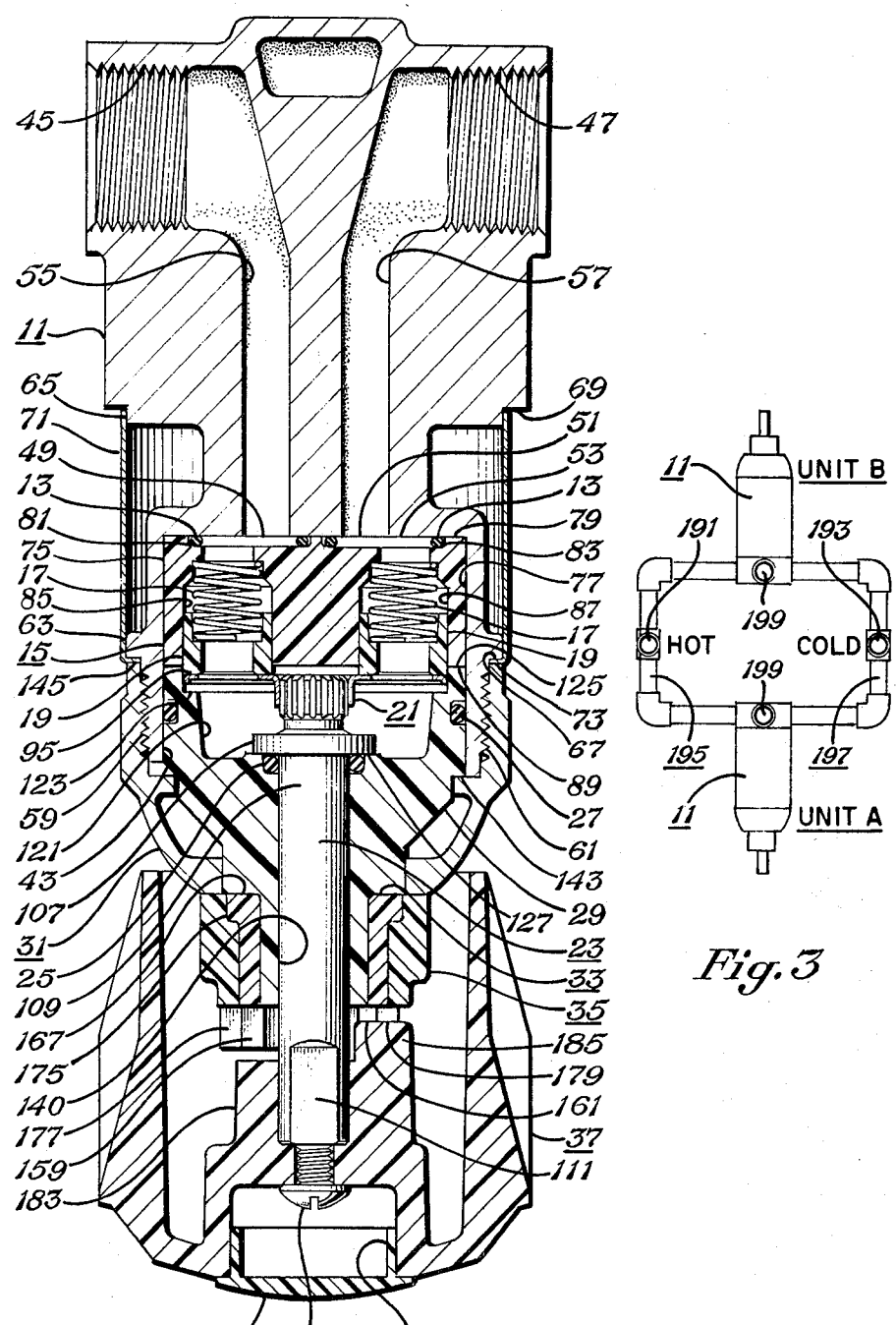

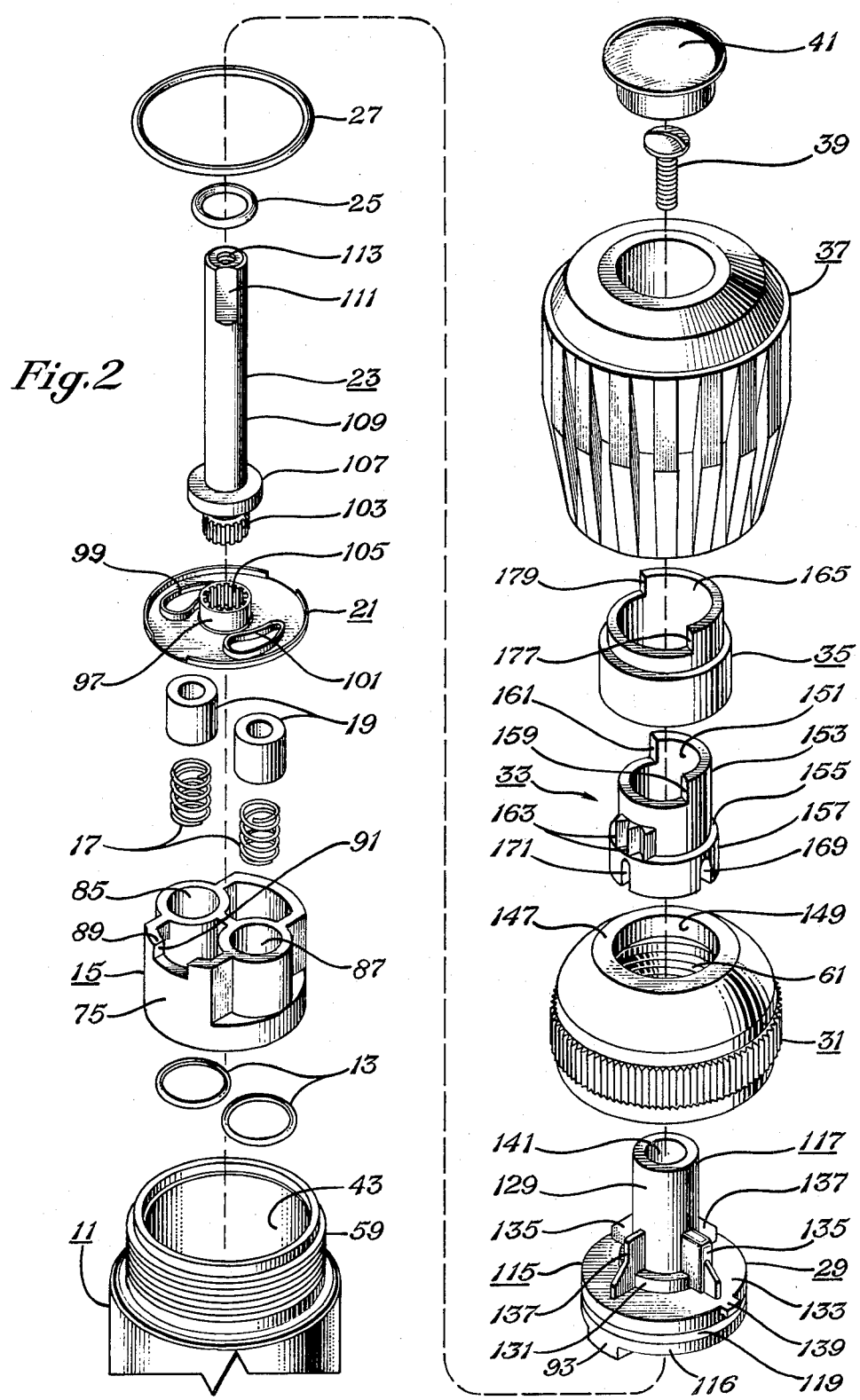

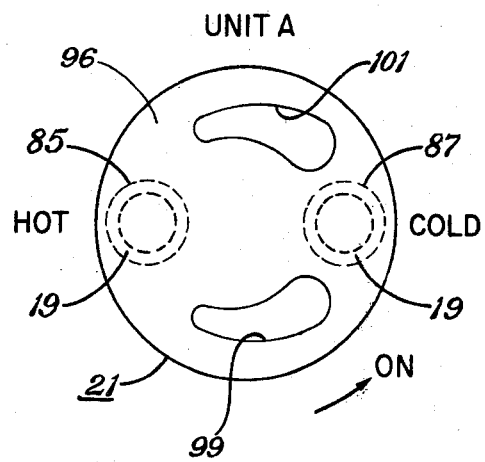
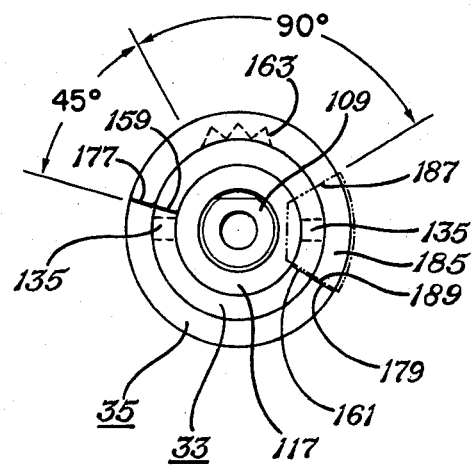
Fig.4  Fig.5
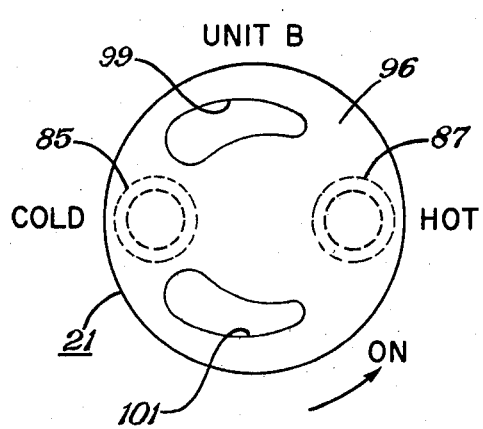
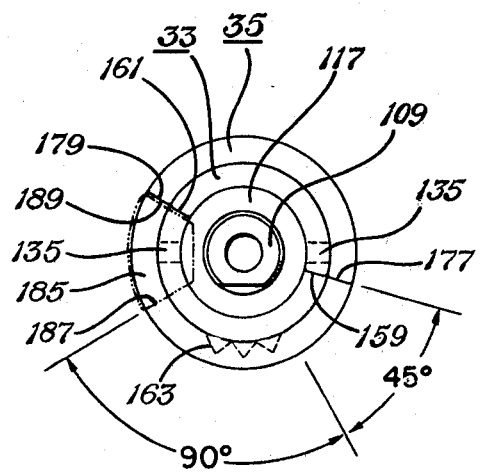
Fig.6  Fig.7

MIXING VALVE FOR BACK TO BACK INSTALLATION

FIELD OF INVENTION

The invention relates to single handle mixing valves, and more particularly to single handle mixing valves such as tub/shower valves that are to be used in back to back installations.

DESCRIPTION OF THE PRIOR ART

There are numerous instances, for example in apartment buildings and hotels, where hot and cold water supply pipes serve tube/shower facilities that are arranged back to back on opposite sides of a common wall. In such instances, unless expensive cross over piping is employed, a valve unit that is properly oriented with respect to the hot and cold water supply when installed on one side of the common wall will not be properly oriented when installed on the opposite side of the common wall. Such improper orientation can cause the water mix to be uncomfortably or even dangerously hot in the initial phase of valve opening.

In the prior art of which I am aware it has been made possible to achieve proper orientation of a valve unit in such a back to back installation by the re-orientation or reversal of a part or parts within the valve body. For example, in U.S. Pat. No. 3,674,048, the bonnet 20 is unscrewed and removed to expose the interior of the valve body 11 so that the bushing member 19 can be lifted out and rotated 180° and replaced in the valve body, after which the bonnet 20 is again installed. This re-orientation of the bushing member then accomplishes proper orientation of the valve unit for back to back installation.

The objective of this invention is to provide an improved mixing valve for back to back installation wherein proper orientation of a valve unit can be achieved by the re-orientation or reversal of a part or parts exteriorly of the valve body.

BRIEF DESCRIPTION OF DRAWINGS

FIG. 1 is a schematic longitudinal section view of a valve unit in accordance with a preferred embodiment of the invention.

FIG. 2 is an exploded view showing the various parts or elements of the valve unit of FIG. 1.

FIG. 3 is a schematic diagram showing a typical hot and cold water supply piping arrangement for a back to back valve unit installation.

FIG. 4 is a schematic diagram showing the relative positions of the control disc and inlet seals for the closed condition of the valve unit on one side of a back to back installation.

FIG. 5 is a schematic diagram showing the relative positions of certain valve unit parts corresponding with FIG. 4.

FIG. 6 is a schematic diagram showing the relative positions of the control disc and inlet seals for the closed condition of the valve unit on the side of a back to back installation opposite to that shown in FIG. 4.

FIG. 7 is a schematic diagram showing the relative positions of certain valve unit parts corresponding with FIG. 6.

DESCRIPTION OF PREFERRED EMBODIMENT

The valve unit as shown by FIGS. 1 and 2 includes a valve body 11, inlet o-rings 13, a seal adapter 15, inlet seal springs 17, inlet seals 19, a control disc 21, a control stem 23, a control stem o-ring 25, a cap o-ring 27, a cap 29, a bonnet 31, a stop bushing 33, a maximum temperature stop 35, a handle 37, a handle retainer screw 39, and a handle plug button 41.

The valve body 11 is generally cylindrical and has a central bore 43 at its outer end region for receiving various valve parts. Internally threaded inlet openings 45, 47 for connection to the hot and cold water supplies are provided at the inner end region of the valve body 11. The central axes of the valve body inlet openings 45, 47 are common and are normal to the central axes of the valve body 11 and its central bore 43. Hot and cold inlet openings 49, 51 in the bottom wall 53 of the central bore 43 communicate via respective passages 55, 57 with the valve body inlet openings 45, 47. The valve body 11 has external threads 59 at its outer end portion for matingly engaging internal threads 61 of the bonnet 31. The valve body exterior has first and second cylindrical surfaces 63, 65 having a common diameter. The first cylindrical surface 63 merges with a first shoulder 67 located adjacent the inner end of the valve body external threads 59 and the second cylindrical surface 65 merges at its inner end with a second shoulder 69. A decorative sleeve 71 is matingly received by the first and second cylindrical surfaces 63, 65 and has an inward extending flanged portion 73 which rests on the first shoulder 67 and is held in place by the bonnet 31. The valve body 11 is also provided the usual passage (not shown) communicating between the mixing chamber and the valve spout and the shower riser.

The seal adapter 15 has a cylindrical exterior surface 75 that is matingly received by the side wall 77 of the valve body central bore 43 and has a planar inward end surface 79 that abuts the bottom wall 53 of valve body central bore 43. The seal adapter 15 has counterbores 81, 83 opening to the bottom end surface 79 for receiving inlet o-rings 13. The seal adapter 15 also has counterbores 85, 87 opening to a planar outward end surface 89 for receiving the inlet seal springs 17 and inlet seals 19 in the usual manner. The seal adapter 15 is keyed to the cap 29 by means of a slot 91 in the seal adapter outward end surface 89 which engages a projection 93 on the inward face of the cap 29.

The control disc 21 has a planar inward face 95 and a central outward extending hub 97. Conventional oppositely disposed generally kidney shaped control openings 99, 101 in the control disc 21 provide for a desired hot-cold water mix action. The control stem 23 is provided serrations 103 at its inward end portion which matingly engage serrations 105 on the inner surface of the hub 97 to provide driving means for the control disc 21. The serrations 103, 105 are interrupted by a respective mating key slot and spline (not shown) so that in assembly the control disc 21 will be properly oriented with respect to the control stem 23. The control stem 23 has a flange portion 107 ajacent and outward of the serrations 103. The control stem shaft 109 outward of the flange 107 has the usual cylindrical shape, with a flat 111 at the outward end portion. The control stem shaft 109 has a threaded bore 113 opening at its outward end to receive the handle retainer screw 39.

The cap 29 includes a base portion 115 and a base extension portion 117. The base portion 115 is generally disc-shaped and has a cylindrical exterior surface 116 with a peripheral groove 119 for receiving the cap o-ring 27. The disc shaped base portion is sized so that the cylindrical exterior surface 116 will mate with the valve body central bore 43. The base portion 115 has a cavity 121 opening to a first planar bearing surface 123 formed by a first counterbore which opens to a second planar bearing surface 125 which is also the inward face of the cap 29. A third planar bearing surface 127 is incorporated in the bottom of the central cavity 121. A second counterbore for receiving the control stem o-ring 25 opens to the third planar bearing surface 127. The cap base extension portion 117 is integral with the base portion 115 and has a first cylindrical surface 129 which merges with a second cylindrical surface 131 of greater diameter which in turn merges with the outward face 133 of the base portion 115. A first set of oppositely disposed key ribs 135 extends radially outward from the first cylindrical exterior surface 129 in the region adjacent the cap base portion 115 and merges with the outward face 133 of the base portion 115. A second set of similar oppositely disposed ribs 137 is located 90° away from the first set. A key lug 139 protrudes radially outward from the cap base position cylindrical exterior surface 116 and mates with a slot (not shown) in the valve body 11. The cap 29 has a central bore 141 which is sized to matingly receive the control stem shaft 109.

The bonnet 31 has internal threads 61 which mate with the external threads 59 on the valve body 11. The bonnet 31 also has an internal shoulder portion 143 adjacent the base of the internal threads 61. The bonnet 31 further has a first planar bearing surface 145 at its inward end and a second planar bearing surface 147 at its outward end. In addition, the bonnet 31 has a cylindrical central bore 149 opening to its outward end.

The stop bushing 33 has a central bore 151 sized to mate with the cap base section first cylindrical exterior surface 129, a first cylindrical exterior surface 153 that extends from the stop bushing outward end to merge with an exterior shoulder 155 which also merges with a second cylindrical exterior surface 157 of larger diameter which extends to the stop bushing inward end. The outward end of the stop bushing 33 is notched to provide valve open and valve closed stop surfaces 159, 161 that are 195° apart. Formed on stop bushing first cylindrical exterior surface 153 and projecting radially outward are a series of splines 163 disposed 15° apart and sized to mate with a series of corresponding slots (not shown) disposed in the central bore 165 of the maximum temperature stop 35. The stop bushing 33 has an inward end surface 167. A first set of oppositely disposed slots 169, sized to mate with the first set of oppositely disposed ribs 135 on the cap 29, are formed in the stop bushing inward end portion and open to the inward end surface 167. A second set of oppositely disposed slots 171 are located 90° away from the first set and sized to mate with the second set of oppositely disposed ribs 137 on the cap 29, are formed in the stop bushing inward end portion and open to the inward end surface 167.

The maximum temperature stop 35 has a central bore 165 sized to mate with the stop bushing first cylindrical exterior surface 153 and which merges at the maximum temperature stop bushing inward region with an enlarged counterbore 175 that is sized to mate with the stop bushing second cylindrical exterior surface 157. The outward end of the maximum temperature stop 35 is notched to provide valve open and valve closed stop surfaces 177, 179 that are 195° apart.

The handle 37 is retained on the control stem shaft 109 by the usual screw 39, and the handle screw receiving cavity 181 is closed by the usual plug button 41. The handle 37 also has a conventional reentrant portion 183 having an inner end surface from which there protrudes an integral stop wedge 185 having valve open and valve stop surfaces 187, 189 that are 60° apart.

In assembly, the inlet o-rings 13 and the inlet seals 19 and inlet seal springs 17 are installed in the seal adapter 15 and the seal adapter 15 is inserted in the valve body central bore 43. The control disc 21 is installed on the control stem 23 and the assembly is inserted in the valve central bore 43. The control stem o-ring 25 is installed on the control stem 23 and the cap o-ring 27 is installed in the cap peripheral groove 119. Then the cap 29 is inserted in the valve body central bore 43 with the cap central bore 141 being matingly received on the control stem shaft 109. Next, the bonnet 31 is threaded onto the valve body 11 with the bonnet shoulder portion 143 bearing on the outward face 133 of the cap base portion 115, so that the cap second planar bearing surface 125 which is its inward face, bears on the seal adapter planar outward surface 89 which is its outward face, and so that the seal adapter planar inward end surface 79 bears on the bottom wall 53 of the valve body central bore 43. The inlet seals 19 are urged into contact with the control disc planar inward face 95 by the force of the inlet seal springs 17, which in turn causes the control stem flanged portion 107 to engage the cap third planar bearing surface 127. Next, the stop bushing 33 is installed on the cap 29, with its central bore 151 being matingly received by the cap base extension first cylindrical surface 129 and with the slot sets 169, 171 being received by the respective cap rib sets 135, 137. Then, the maximum temperature stop 35 is installed on the stop bushing 33 with the central bore 165 and enlarged counterbore 175 being matingly received respectively by the stop bushing first and second cylindrical exterior surfaces 153, 157, and with the stop bushing splines 163 receiving corresponding slots (not shown) disposed in the central bore 165 of the maximum temperature stop 35. Next, the handle 37 is installed on the control stem 23 and then the retainer screw 39 and the plug button 41 are installed. The foregoing assembly procedure serves to explain the relationship of the various parts and is exemplary only, and may be varied in actual practice to achieve maximum convenience and efficiency. For example, all of the parts that are to be disposed within the valve body 11 maybe pre-assembled and inserted in the valve body central bore 43 as a unit, followed by installation of the bonnet 31.

Referring now to FIG. 3 of the drawings, there is shown in schematic form, a typical hot and cold water supply piping arrangement for a back to back valve unit installation. There is a hot water supply riser 191 which feeds the hot water supply pipe system 195, and a cold water supply riser 193 which feeds the cold water supply pipe system 197. UNIT A and UNIT B are valve units of the type shown by FIGS. 1 and 2. As can be seen, UNIT A will receive hot water via its inlet opening 45 and cold water via its inlet opening 47; whereas, UNIT B will receive cold water via its inlet opening 45 and hot water via inlet opening 47. Threaded inlet opening 45 in both the case of UNIT A and UNIT B corresponds with passage 55, inlet opening 49 and seal adapter counterbore 85, while threaded inlet opening 47 in both cases corresponds with passage 57, inlet opening 51 and seal adapter counterbore 87.

FIG. 4 shows the relative positions of the control openings 99, 101 of the control disc 21 and seal adapter counterbores 85, 87 for UNIT A in the valve closed condition, looking at the control disc outward face 96. FIG. 5 shows the relative positions of the stop bushing and maximum temperature stop valve open stop surfaces 159, 177, the stop bushing and maximum temperature stop valve closed stop surfaces 161, 179, and the handle valve open and valve closed stop surfaces 187, 189 for UNIT A. It can be seen that as the handle is rotated in the normal counterclockwise direction for opening, the control opening 99 will first begin to admit cold water to the mixing chamber and upon further rotation the control opening 101 will begin to admit hot water to the mixing chamber, thus achieving the desired hot/cold water mixture control.

FIG. 6 shows the relative positions of the control openings 99, 101 of the control disc 21 and seal adapter counterbores 85, 87 for UNIT B in the valve closed condition, again looking at the control disc outward face 96. FIG. 7 shows the relative positions of the stop bushing and maximum temperature stop valve open stop surfaces 159, 177, the stop bushing and maximum temperature stop valve closed stop surfaces 161, 179 and the handle valve open and valve closed stop surfaces 187, 189 for UNIT B. It can be seen that as the handle is rotated in the normal counterclockwise direction for opening, the control opening 101 will first begin to admit cold water to the mixing chamber and upon further rotation the control opening 99 will begin to admit hot water to the mixing chamber, thus again achieving a desired hot/cold water mixture control.

When the stop bushing 33 is installed in the original or factory assembly of the valve unit, it will be conventional to assume that the hot water supply will enter via the internally threaded inlet opening 45, and accordingly the stop bushing 33 will be oriented for the conditions shown by FIGS. 4 and 5 for UNIT A.

When the valve unit is to be installed in a back to back configuration as illustrated in FIG. 3, then the valve unit that is to be installed as UNIT B must have its stop bushing 33 rotated 180° away from its originally assembled position. To accomplish this it is only necessary to remove the handle 37 and then simply lift the maximum temperature stop 35 out, then lift the stop bushing 33 sufficiently for the slot sets 169, 171 to clear the rib sets 135, 137 and rotate it 180° and then re-engage the slot sets and key rib sets and re-install the maximum temperature stop and the handle. In re-installing the handle 37 it will of course be necessary to rotate the control stem 23 sufficiently to permit movement of the handle stop wedge 185 into the notched portions of the stop bushing 33 and maximum temperature stop 35. Then, when the handle is rotated to the clockwise extreme, the valve of UNIT B will be closed and the various parts will have the relationships shown by FIGS. 6 and 7.

It is apparent from the foregoing that the present invention does provide an improved mixing valve for back to back installation wherein proper orientation of a valve unit can be achieved by the re-orientation or reversal of a part or parts exteriorly of the valve body. In other words it not necessary to remove the bonnet or dis-assemble any of the parts that are installed within the valve body in order to achieve proper orientation of valve unit parts for back to back installation.

It is possible to limit the maximum temperature of the water mix by changing the relationship of the stop bushing 33 and the maximum temperature stop 35. The relationship shown in FIGS. 5 and 7 provides a maximum temperature water mix since the stop surface 177 is aligned with the stop surface 159, permitting rotation of the handle 37 and consequently the control disc 21 through the maximum rotational angle of 135°, which in turn makes possible the maximum hot to cold water ratio. This maximum rotational angle can be decreased in 15° increments to a minimum of 90° by simply selecting the appropriate relationship of the stop bushing splines 163 to the corresponding slots (not shown) disposed in the central bore 165 of the maximum temperature stop 35. For example, for the minimum hot to cold ratio the maximum temperature stop 35 will have been moved 45° clockwise relative to the stop bushing 33 so that the stop surface 177 is only 90° away from the stop surface 161.

The foregoing disclosure and the showings made in the drawings are merely illustrative of the principles of this invention and are not to be interpreted in a limiting sense.

I claim:

1. A single handle mixing valve comprising:
   a. a valve body having a bore forming a cavity with a sidewall, a bottom wall and an open top; said valve body further having hot and cold water inlet openings communicating with hot and cold water inlets in said cavity bottom wall;
   b. bonnet means removably fixed to said valve body and forming a partial outer end closure for said valve body cavity at its open top;
   c. cap means having a central bore, a first portion that is disposed interiorly of said bonnet means and a second portion that is disposed exteriorly of said bonnet means, with said cap means being retained by coaction of said first portion and said bonnet means;
   d. a water mixing chamber within said valve body and at least partially defined by the inward end surfaces of said cap first portion;
   e. inlet seals communicating with said inlets in said cavity bottom wall and opening to said mixing chamber;
   f. a control disc having a surface coacting with said inlet seals and having first and second oppositely disposed control openings;
   g. a stop bushing matingly received by said cap means second portion;
   h. a control stem driving said control disc, with said control stem being received by and protruding beyond the outer end of said cap central bore and said stop bushing;
   i. a handle received by the outer end portion of said control stem and removably retained thereon, with said handle having a stop means disposed adjacent said stop bushing;
   j. valve open and valve closed stop surfaces incorporated in said stop bushing for engagement with said handle stop means;
   k. means for establishing and maintaining a predetermined fixed relationship between said handle stop means and said control disc openings;
   l. means for establishing and maintaining a predetermined fixed relationship between said cap means, said inlet seals and said valve body;
   m. means for selectively establishing and maintaining either of a first predetermined fixed relationship between said stop bushing and said cap means such that said control disc control openings are properly oriented and move in the proper sequence from the valve closed to the valve open positions for installation of a first valve unit in a back to back installation, or a second predetermined fixed relationship between said stop bushing and said cap means such that said control disc openings are properly oriented and move in the proper sequence from the valve closed to the valve open positions for installation of the second valve unit in a back to back installation.

2. A single handle mixing valve comprising:
a. a valve body having hot and cold water inlets communicating with hot and cold water inlet seals opening to a mixing chamber;
b. a control disc having a surface coacting with said inlet seals and having first and second oppositely disposed control openings and being driven by a control stem;
c. cap means retained by a bonnet which is removably fixed to said valve body, with said cap means having a bore for matingly receiving said control stem, and with said cap means having a stop bushing receiving portion disposed exteriorly of said valve body and said bonnet;
d. a stop bushing removably received by said cap means stop bushing receiving portion, with said stop bushing incorporating valve open and valve closed stop surfaces;
e. a handle received by the outer end portion of said control stem and removably retained thereon, with said handle having a stop means disposed adjacent said stop bushing for engagement with said stop bushing stop surfaces;
f. means for establishing and maintaining a predetermined fixed relationship between said handle stop means and said control disc openings;
g. means for establishing and maintaining a predetermined fixed relationship between said cap means, said inlet seals and said valve body;
h. means for selectively establishing and maintaining either of a first predetermined fixed relationship between said stop bushing and said cap means such that said control disc control openings are properly oriented and move in the proper sequence from the valve closed to the valve open positions for installation of a first valve unit in a back to back installation, or a second predetermined fixed relationship between said stop bushing and said cap means such that said control disc openings are properly oriented and move in the proper sequence from the valve closed to the valve open positions for installation of the second valve unit in a back to back installation.

* * * * *